H. M. ST. JOHN.
SAFETY APPLIANCE FOR STEAM ENGINES.
APPLICATION FILED JUNE 5, 1914.

1,154,549.

Patented Sept. 21, 1915.
2 SHEETS—SHEET 1.

Witnesses
R. M. Jones.

Inventor
H. M. St John.
By
Attorney

H. M. ST. JOHN.
SAFETY APPLIANCE FOR STEAM ENGINES.
APPLICATION FILED JUNE 5, 1914.

1,154,549.

Patented Sept. 21, 1915.
2 SHEETS—SHEET 2.

Witnesses
R. N. Jones.
E. P. Burnee

Inventor
H. M. St John
By A. Randolph Jr.
Attorney

UNITED STATES PATENT OFFICE.

HOWARD M. ST. JOHN, OF PASSAIC, NEW JERSEY.

SAFETY APPLIANCE FOR STEAM-ENGINES.

1,154,549.     Specification of Letters Patent.     Patented Sept. 21, 1915.

Application filed June 5, 1914. Serial No. 843,264.

*To all whom it may concern:*

Be it known that I, HOWARD M. ST. JOHN, a citizen of the United States, residing at Passaic, in the county of Passaic and State of New Jersey, have invented certain new and useful Improvements in Safety Appliances for Steam-Engines, of which the following is a specification.

This invention relates to safety appliances for steam engines, and one of the principal objects of the invention is to provide reliable and efficient means for automatically closing the throttle in case an excess of water from the boiler enters the cylinder of the engine.

Another object of the invention is to provide reliable means to automatically cut off the steam in case the amount which would be controlled by the trap should enter the cylinder and render the operation of the engine dangerous.

In stationary engines it is customary to provide a trap for leading off the water from the separator, and under various conditions it is found that the ordinary trap will not dispose of the water rapidly enough in case the boiler is foaming or priming, and as a consequence water will collect in the cylinder in sufficient quantity to blow out the cylinder heads.

It is to overcome the defects referred to and to provide automatic means of cutting off the supply of steam to the engine whenever the conditions are such as to render the operation of the engine dangerous owing to the presence of water in the cylinder.

Figure 1:
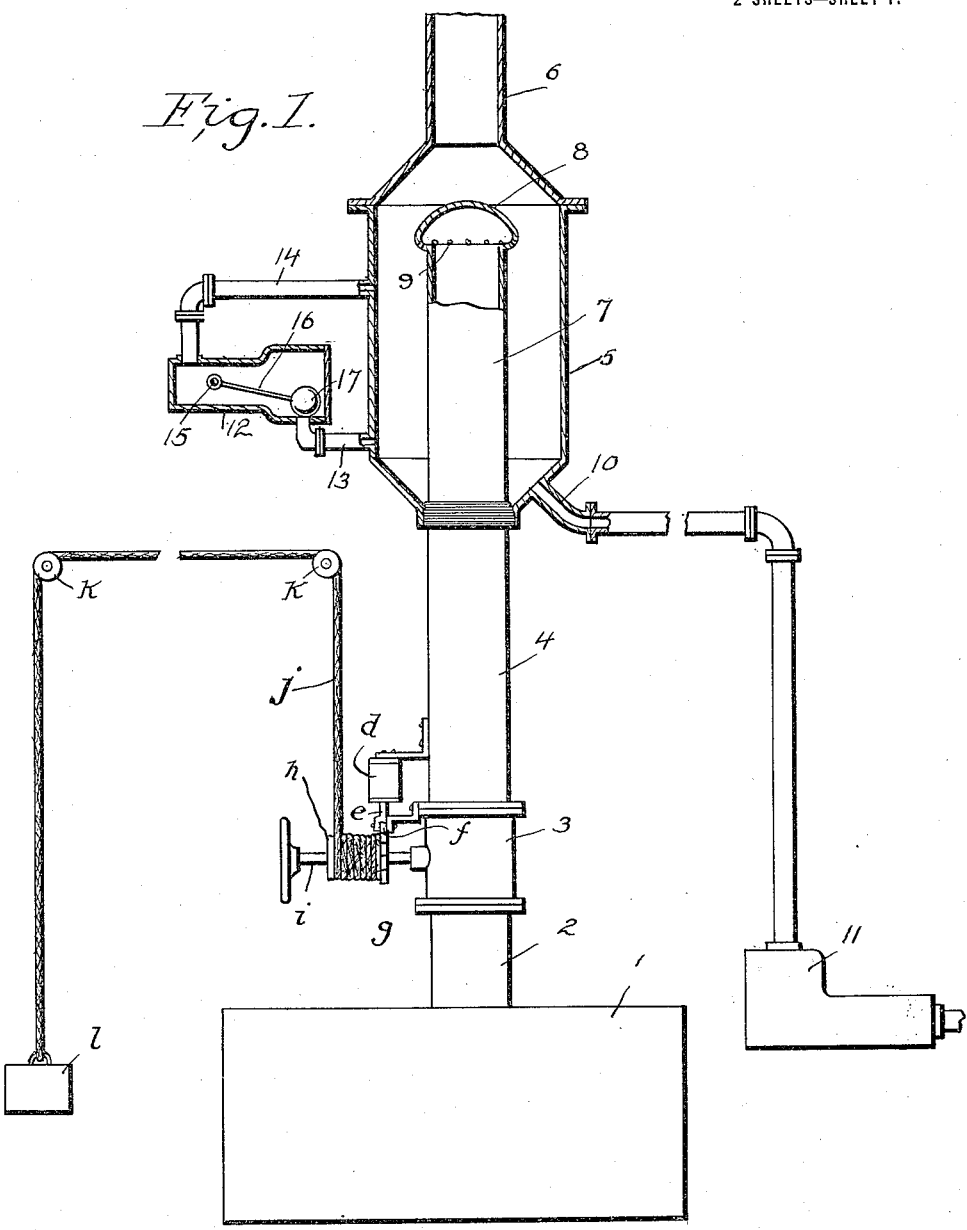
Figure 2:
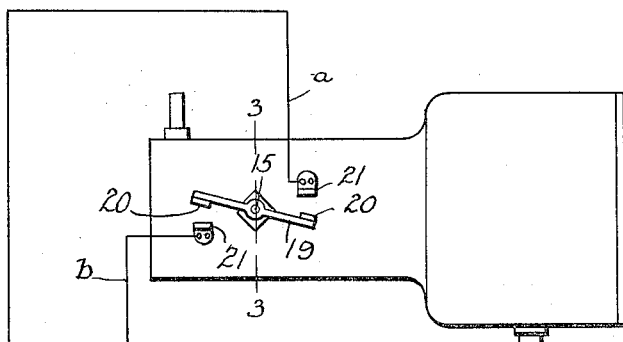
Figure 2:
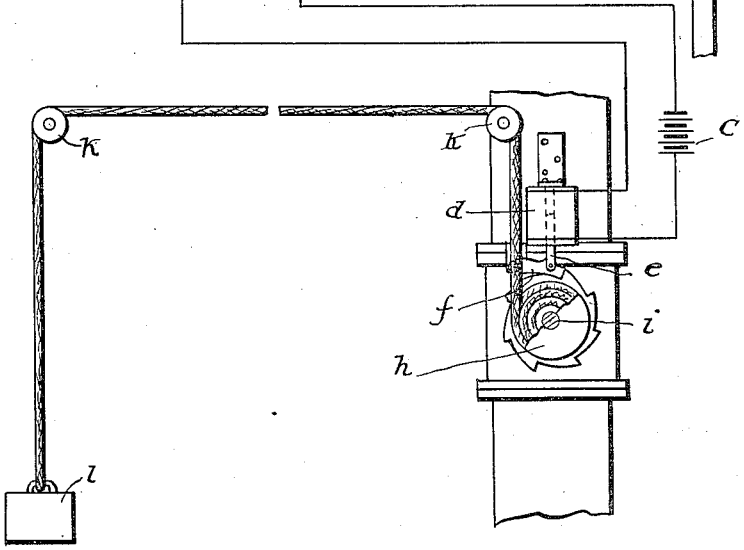
Figure 3:
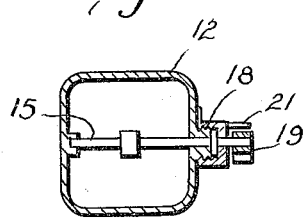

The objects and advantages herein referred to may be attained by means of the construction illustrated in the accompanying drawings, in which:

Figure 1 is a view in section and partial elevation of an appliance made in accordance with this invention. Fig. 2 is a side elevation and partial section of the appliance, and Fig. 3 is a detail sectional view taken on the line 3—3 of Fig. 2.

Referring to the drawings, the numeral 1 designates the cylinder of the engine, 2 is the steam pipe leading to said cylinder, 3 is the throttle valve and 4 is the pipe leading to the separator 5, and 6 is the live steam pipe from the boiler. Disposed in the separator 5 is the stand pipe 7 having a cap 8 thereon and said stand pipe is provided with inlet openings 9 to admit the steam to the cylinder 1. The numeral 10 designates the outlet pipe leading to the usual trap 11 for disposing of the water of condensation from the steam. As thus far described, the parts are of the usual or suitable construction.

Connected to one side of the separator 5 is a water tank 12 provided with a pipe 13 leading from the bottom of the tank into the separator 5 while a pipe 14 is connected to the upper side of the tank and leads to the separator.

Mounted on a shaft 15 journaled in the tank 12 is a float rod 16 carrying a ball float 17 at one end thereof, said float being sufficiently buoyant to rise with the water as it flows into the tank. The shaft 15 extends through the side of the tank 12 and through a stuffing box 18 and connected to the shaft 15 outside the tank is a two armed lever 19 having at each of its opposite ends a contact plate 20.

It is to be understood that the float rod is fixed to the shaft 15 and that the lever 19 is also fixed to the shaft outside the tank. Contact points 21 are connected to the sides of the tank, and electrical conductors $a$ and $b$ lead from the contact points 21 to a battery $c$ and from thence to a magnet $d$ supported at the side of the pipe 4 adjacent the throttle valve 3. A solenoid $e$ is mounted in the magnet and connected pivotally to the lower end of the solenoid is a pawl $f$ which normally engages the teeth of a ratchet wheel $g$, mounted at the end of a winding drum $h$. The drum $h$ may be mounted on the valve stem $i$ of the throttle valve 3, and a rope or cable $j$ is wound on the drum $h$ and passes over pulleys $k$ and is provided with a depending weight $l$ at its end.

The operation of the invention may be briefly described as follows: When water from the boiler accumulates in the separator 5 in such quantity that it cannot be controlled by means of the outlet 10 and the trap 11, the water will flow through the pipe 13 into the tank 12 and when the float 17 rises to about a horizontal position, the lever 19 is operated and the plates 20 are brought into contact with members 21 and a circuit is completed to the magnet $d$ which pulls up the solenoid $e$ and lifts the pawl $f$ from the ratchet wheel $g$, thus permitting the weight $l$ to rotate the valve stem $i$ of the throttle valve to close the throttle, thus cutting off the supply of steam and stopping the engine.

From the foregoing it will be obvious that a device made in accordance with this invention is comparatively simple in construction, can be applied to any engine with very slight cost for instalment and is reliable and efficient for the purpose intended, and will stop the engine in case there is an excess of water which can not be taken care of by the ordinary trap.

Various changes in the details of construction may be resorted to without departing from the spirit and scope of the invention as defined in the claims.

What is claimed is:

1. In combination, a water separator, a steam supply pipe leading therefrom, a tank adjacent said separator, a pipe leading from the separator to the tank, a rock shaft mounted in the tank, an arm extending from the rock shaft, a float on the end of the arm, a contact arm on the shaft outside the tank, two contacts on the outside of the tank with which the opposite ends of the contact arms coöperate to close a circuit, a rotating valve including a stem in the steam supply pipe, means including a weight for closing the valve when water raises the float in the tank and brings the contact arms in touch with the two contacts, and means including a solenoid, wires and a battery for releasing the valve to allow the weight to close the latter when the water rises in the tank and the contact arms and contacts close the circuit.

2. In combination, a water separator, a steam supply pipe leading therefrom, a tank adjacent said separator, pipes leading from the separator to the tank, a rock shaft mounted in the tank, an arm extending from the rock shaft, a float on the end of the arm, a contact arm on the shaft outside the tank, two contacts on the outside of the tank with which the opposite ends of the contact arms coöperate to close a circuit, a rotating valve including a stem in the steam supply pipe, a drum and ratchet wheel on the stem, a cable passing around the drum, a weight on the cable, a solenoid including a core adjacent the valve, a pivoted pawl engaging the ratchet, said core pivoted to the pawl, wires leading from the solenoid to the two contacts, and a battery connected to one of said wires, whereby when the float rises the circuit will be closed and lift the pawl and the weight will operate to close the valve.

In testimony whereof I affix my signature in presence of two witnesses.

HOWARD M. ST. JOHN.

Witnesses:
   Arthur S. Hughes,
   Thos. Hughes.

Copies of this patent may be obtained for five cents each, by addressing the "Commissioner of Patents, Washington, D. C."